May 6, 1941.  G. N. LEVESQUE ET AL  2,240,506
POWER KNOCKOUT DEVICE FOR MACHINE TOOLS
Filed March 14, 1940  2 Sheets-Sheet 1
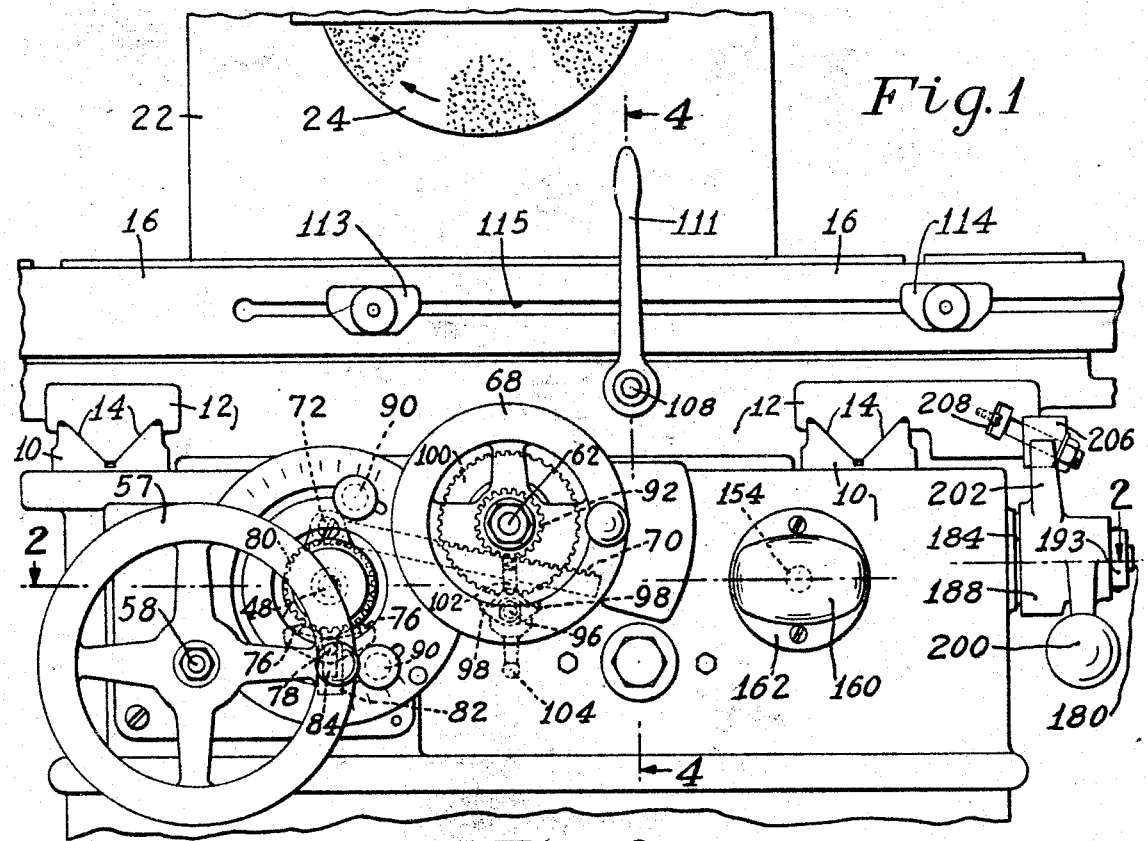
Fig.1
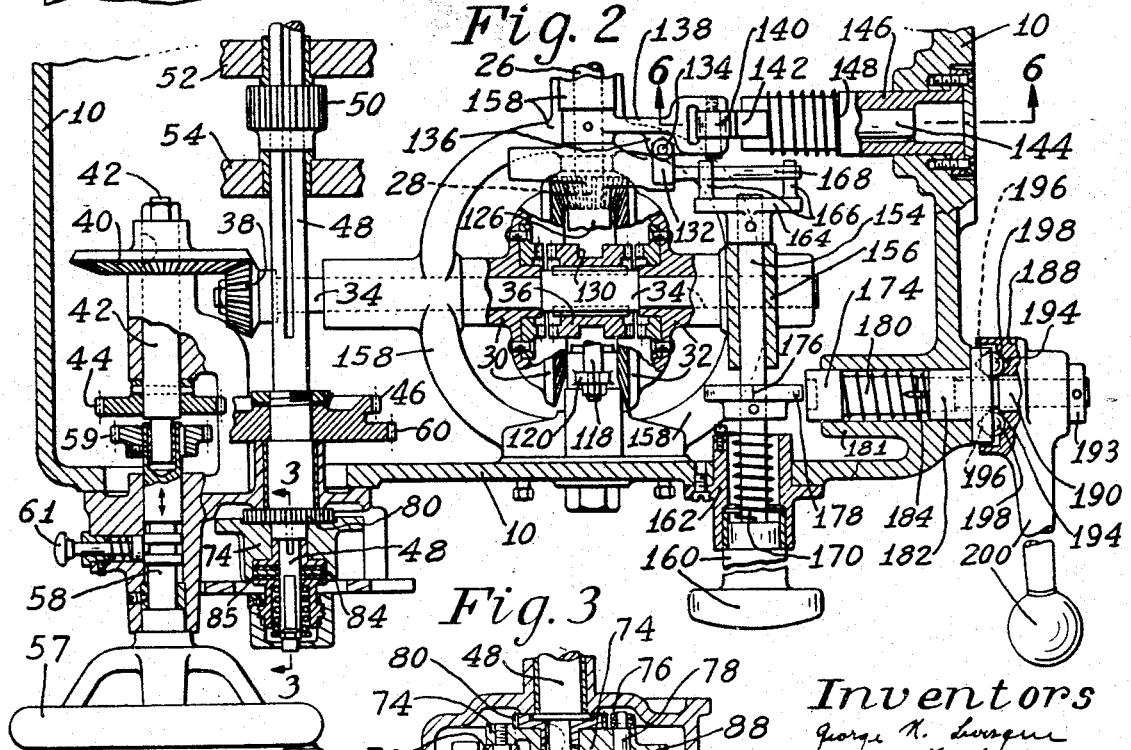
Fig.2
Fig.3
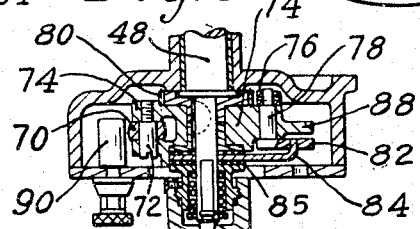
Witness
Charles T. Olson
Inventors
George N. Levesque
Merrill T. Sebring
Frank Hildreth May 6, 1941.    G. N. LEVESQUE ET AL    2,240,506
POWER KNOCKOUT DEVICE FOR MACHINE TOOLS
Filed March 14, 1940    2 Sheets-Sheet 2
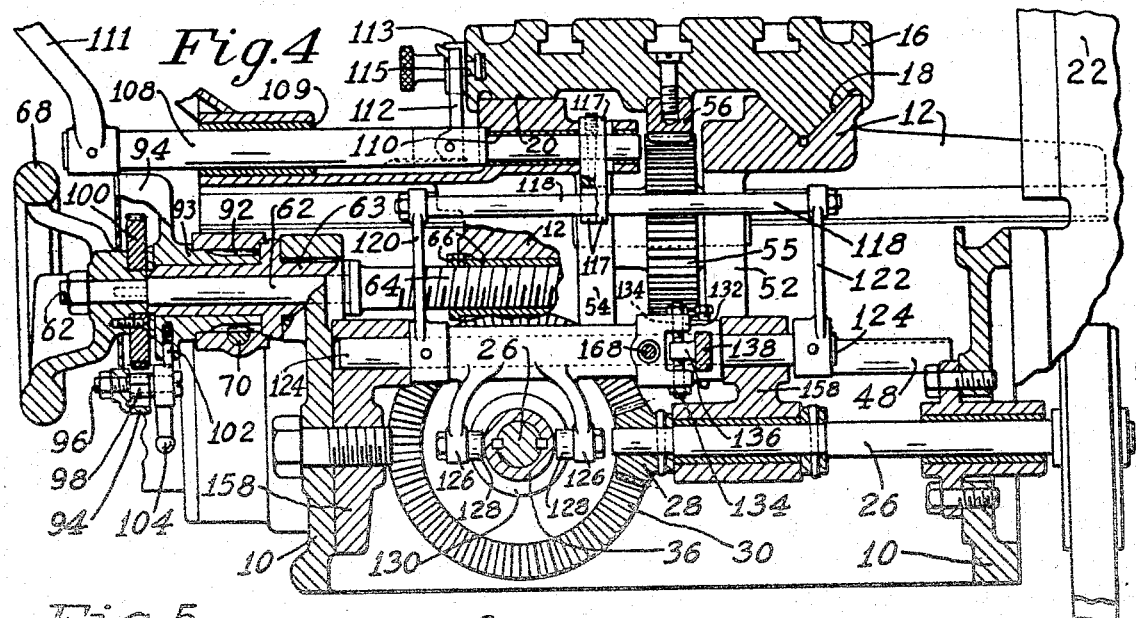
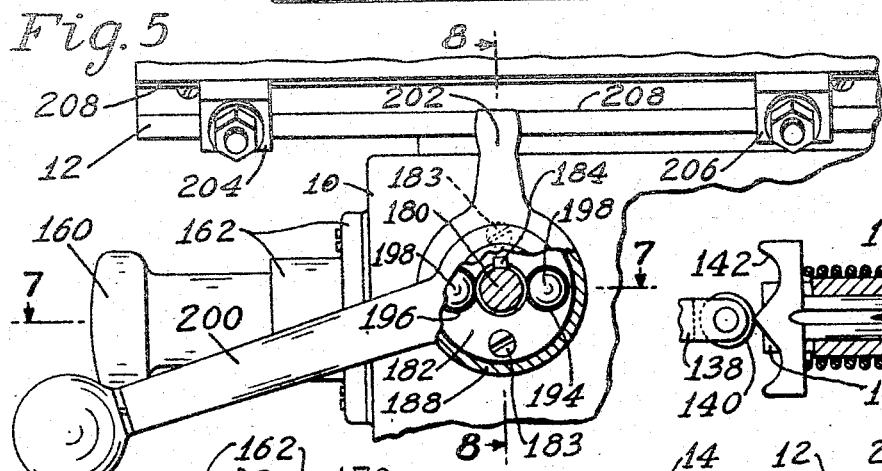
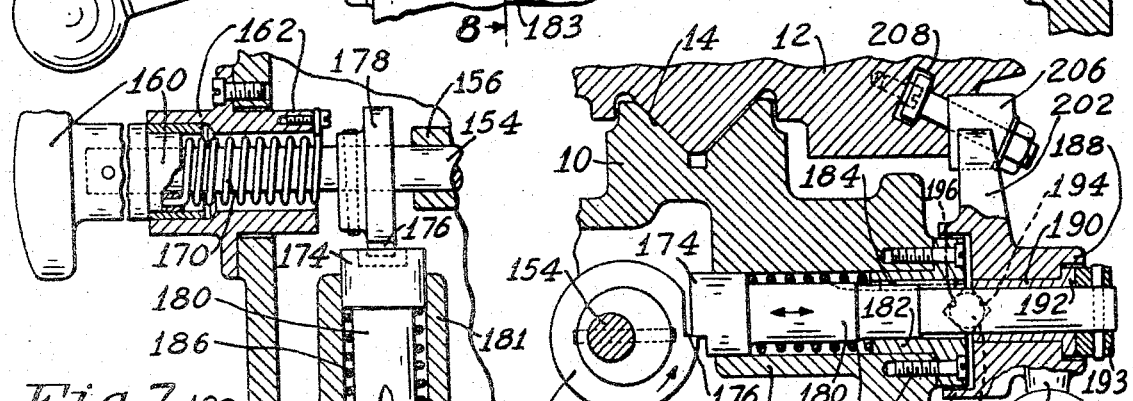
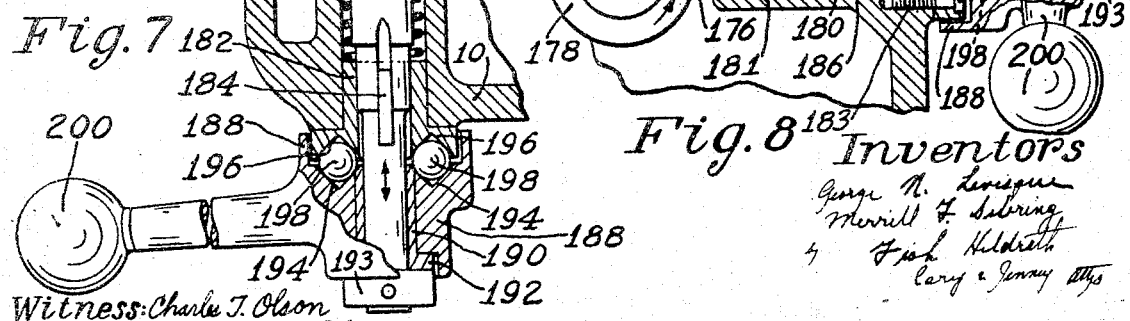

Patented May 6, 1941

2,240,506

UNITED STATES PATENT OFFICE 2,240,506

POWER KNOCKOUT DEVICE FOR MACHINE TOOLS

George N. Levesque and Merrill F. Sebring, Providence, R. I., assignors to Brown and Sharpe Manufacturing Company, a corporation of Rhode Island Application March 14, 1940, Serial No. 323,930

8 Claims. (Cl. 192—143)

The present invention relates to improvements in machine tools, and more particularly to an improved power knockout device adapted to disconnect one or a plurality of interrelated movable supports from power operation.

The invention is herein disclosed as embodied in a plane grinding machine of the general type having a horizontally disposed and vertically adjustable grinding wheel spindle, and a work supporting assembly including a stationary base support, a saddle support transversely movable on the base, and a work supporting table longitudinally movable on the saddle support. The illustrated machine is provided with power operating means including a starting, stopping and reversing clutch, and connections therefrom for driving the table, and additional connections which may be rendered operative with each reciprocation of the table to impart a stepped cross feeding movement to the saddle support. A clutch shifting mechanism is provided which may be of ordinary description for controlling the operation of the work table, and is arranged to be controlled either manually from a feed lever, or automatically by table dogs. A booster device associated with the clutch shifting mechanism acts to shift the clutch to its alternate engaging position at each reversal of the table drive in order to provide for a continuous automatic reciprocation of the table under the control of the table dogs.

It is a principal object of the present invention to provide a novel and improved knockout device which may be actuated manually or automatically if so desired, by means of stop dogs on the saddle support to disconnect the power drive for the work supporting assembly.

Applicant's improved knockout device in the preferred form hereinafter illustrated and described, comprises a spring actuated device for shifting the table clutch to neutral position, a spring-pressed detent normally operative to lock the clutch shifting device out of operation, a knockout element operable through the agency of cooperating cam surfaces to withdraw the detent, and manual and dog-actuated controllers both rigidly connected to and forming an integral unit with the knockout element.

With the above stated and other objects in view as may hereinafter appear, the several features of the invention consist in the devices, combinations and arrangement of parts hereinafter described and claimed, which together with the advantages to be obtained thereby will be readily understood from the following description taken in connection with the accompanying drawings, in which Fig. 1 is a partial view in front elevation of a surface grinding machine illustrating a preferred form of the invention; Fig. 2 is a sectional plan view taken on the line 2—2 of Fig. 1; Fig. 3 is a detail sectional view, taken on the line 3—3 of Fig. 2; Fig. 4 is a sectional view taken on the line 4—4 of Fig. 1; Fig. 5 is an enlarged detail view in right side elevation of the knockout element, with a portion of the same broken away to illustrate the ball and cam actuating connection; Fig. 6 is an enlarged detail sectional view taken on the line 6—6 of Fig. 2; Fig. 7 is a detail sectional view of the power knockout device taken on the line 7—7 of Fig. 5, the knockout device being shown in its locked inoperative position; and Fig. 8 is a detail sectional view taken on the line 8—8 of Fig. 5.

The surface grinding machine shown in the drawings comprises generally a base 10, a saddle support 12 supported for forward and back movement on ways 14 on the base 10, and a longitudinally movable work supporting table 16 supported in ways 18 and 20 on the saddle support 12. A column 22 provides support for a horizontally arranged and vertically adjustable grinding wheel spindle (not shown) and a grinding wheel 24.

The illustrated machine is provided with power means for reciprocating the table 16 and for imparting step-by-step cross feeding movements to the saddle support 12. The power connections for driving the table comprise a horizontally arranged and forwardly extending drive shaft 26 provided at its forward end with a bevel pinion 28 which meshes with and drives in opposite directions two bevel gears 30 and 32 which are loosely sleeved on a cross shaft 34. A clutch member 36 interposed between the driving gears 30 and 32 and keyed to the shaft 34 is arranged to be moved axially from an intermediate neutral position into clutching engagement alternatively with either of the bevel drive gears 30, 32, to drive the shaft 34 alternatively in opposite directions. A bevel gear 38 on the shaft 34 meshes with a bevel gear 40 on a forwardly extending shaft 42 which also carries a gear 44 meshing with a gear 46 on the table feed shaft 48 suitably supported in bearings on the base 10. The table is driven from the feed shaft 48 through a train of gears supported on the saddle support 12, best shown in Figs. 2 and 4 of the drawings. These connections include a pinion 50 which is keyed to turn with and to move axially on the shaft 48 and is supported between two downwardly extending arms 52, 54, on the saddle support 12. The pinion 50 meshes with a table feed gear 55 which is supported between the arms 52 and 54 and is arranged for meshing engagement with a rack 56 on the under side of the work supporting table 16.

For manual operation of the table, a hand wheel 57 is provided secured to the forward end of a hand wheel shaft 58 which is in axial alignment with the shaft 42 and carries at its rear end a gear 59 adapted for engagement with a gear 60 on the table feed shaft 48. The hand wheel 57 and shaft 58 are movable axially between alternate operative and inoperative positions in which the gear 59 is brought into or out of meshing relation with the gear 60. A spring-pressed plunger 61 arranged for engagement alternatively with two annular grooves in the shaft 58 serves to lock the hand wheel in either of these positions.

The mechanism for effecting cross feeding movements of the saddle support 12 comprises a rearwardly extending cross feed shaft 62 (see Figs. 1 and 4) which is supported against axial movement in a bearing 63 in the machine base, and has formed integrally therewith a feed screw 64 meshing with a nut 66 rigidly secured to the saddle support 12. Manual cross feeding movements may be imparted to the saddle support 12 by means of a cross feed hand wheel 68 secured to the forward end of the cross feed shaft 62.

The present machine is provided with a power cross feed mechanism which is arranged to impart one stepped cross feeding movement to the saddle support 12 for each full reciprocation of the work table 16. This mechanism is driven from the table feed shaft 48, and comprises a cross feed rack 70 (see Figs. 1, 3 and 4) which is actuated by each reversal of the drive of the table feed shaft 48, and acts through a pawl and ratchet mechanism to impart successive incremental rotational movements to the cross feed shaft 62 and feed screw 64. The rack 70 is pivotally supported by means of a pin 72 on a pawl carrying sleeve member 74 (Figs. 2 and 3) loose on the table feed shaft 48. A double pawl member 76 secured to a supporting pin 78 is mounted on the sleeve member 74, and is arranged to be rocked to alternative engaging positions with a driving ratchet 80 secured to the feed shaft 48. The position of the pawl is determined by means of a radially extending lever arm 82 secured to the pawl pivot pin 78. The lever arm 82 is in turn controlled by a lever arm 84 connected by means of a friction device 85 to turn with the table drive shaft 48. Rotation of the table drive shaft 48 acting through the friction arm 84 will rock the pawl 76 in a corresponding direction to operatively engage the pawl with the ratchet 80 to rotate the sleeve 74 and to correspondingly shift the rack 70. This rocking movement continues until arrested by the engagement of the arm 82 and an adjacent lug 88 on the sleeve member 74 with one of two adjustably positioned stop pins 90. Upon reversal of the shaft 48, this operation will be repeated in a reverse direction to impart a return movement to the rack 70. As best shown in Figs. 1 and 4, the rack 70 is arranged for meshing engagement with a pinion 92 formed on a sleeve member 93 supported to turn on the cross feed shaft 62. The sleeve member 93 is provided at its forward end with a bell-shaped extension 94. A pivot pin 96 secured to the under side of the bell 94 provides support for a double pawl 98 which is arranged to mesh in either of two alternative positions with a ratchet 100 secured to the cross feed shaft 62. A spring-pressed plunger 102 seated on the member 94 is arranged to engage with a cam surface 97 formed integrally with the pawl 98. Engagement of the pawl with the V-shaped central portion of the cam surface 97 acts to support the pawl in intermediate neutral position in which the power cross feed is disconnected. Movement of the pawl in either direction from the central position is effected by means of a downwardly extending manual control arm 104 and causes the plunger 102 to ride into engagement with either of two sloping cam surfaces arranged on opposite sides of the V-shaped notch to support one or the other tip portion of the pawl in engagement with the ratchet 100 for effecting a step-by-step power cross feed of the saddle support 16 alternatively in either direction.

Starting, stopping and reversal of the table drive and the power cross feed associated therewith, is effected by means of control mechanism which serves to control the position of the main clutch member 36. The shifting of the clutch may be effected manually by means of table actuated dogs through connections which include a rock shaft 108 mounted in bearings 109, 110, on the saddle support 12. A manual feed lever 111 is secured to the forward end of the rock shaft 108. Also mounted on the rock shaft is an upwardly extending lever arm 112 which is arranged to be acted upon by reversing table dogs 113, 114, adjustably supported in a T-shaped slot 115 in the front side of the work supporting table 16.

Adjacent its rear end the shaft 108 is provided with a downwardly extending fork 117 which embraces a rod 118 carried on two upwardly extending arms 120, 122 rigidly secured to a rock shaft 124 which also provides support for the clutch shifting lever 126. This lever takes the form of a fork on the arms of which are supported two rollers 128 for engagement in a clutch shifting groove 130 in the clutch member 36. The clutch shifting lever 126 is secured in an adjusted angular position to turn with the rock shaft 124 through connections which comprise a lever arm 132 extending laterally from the sleeve hub of the clutch shifting lever 126, and having formed thereon a U-shaped portion to receive two adjusting screws 134. These adjusting screws engage between them a lug 136 formed on a lever arm 138 secured to the rock shaft 124.

The lever arm 138 forms part of a booster mechanism for automatically fully shifting the main clutch member 36 from one to the other running position to reverse the table at the end of its travel in each direction during machine operation. A roller 140 carried on the forked outer end of the lever 138 is arranged for engagement with a cam member 142 formed on the outer end of a spring-pressed plunger 144 which is slidably supported, but is keyed against rotational movement within an axial bore formed in a sleeve support 146 rigidly mounted on the base 10. A compression spring coiled about a reduced portion of the sleeve support 146 and seated at one end against a shoulder 148 on the sleeve support, and at its other end against the member 142, tends to support the cam member 142 in engagement with the roller 140. The cam surface of the member 142 is V-shaped, the roller 140 for an intermediate position of the clutch member 36 being arranged to ride upon the point of the V, so that any additional movement of the clutch shifting lever beyond center under the influence of the table reversing dogs 113 or 114 will render the corresponding sloping surface of the cam operative to shift the lever rm 138 and clutch 36 controlled thereby to its ully engaged position.

In accordance with the present invention, applicants provide a novel and improved mechanism which may be controlled automatically by ogs on the saddle support 12 or by a manually perable trip lever to shift the driving clutch 6 to neutral position and thereby to stop the tachine. The mechanism for shifting the lutch 36 to its neutral position comprises a rock haft 154 which is rotatably supported intermeiate its length in a bearing 156 formed in a fixed racket 158, and at its forward end is fitted with manual control knob 160. The sleeve hub of ie knob 160 is journalled in a bearing 162 seured in the front wall of the base 10, providing dditional support for the rock shaft 154. A ross bar 164 secured to the rear end of the rock haft 154 has formed thereon two pins 166 which re spaced on opposite sides of a rod 168 formıg an extension of the lever arm 132 on the leeve hub of the clutch shifting lever 126. A orsion spring 170 coiled about the rock shaft 54 and attached at one end to the knob and at s other end to the bearing support 162 tends to ock the shaft 154 in a counterclockwise direcion to the position shown in Fig. 2, in which oth pins 166 are engaged with and support the od 168, and clutch shifting lever 126 associated herewith in an intermediate neutral position as hown in Fig. 2.

In order to start the table in power operation, he operator first rotates the knob 160 and shaft 54 through 90° in a clockwise direction, thus noving the pins 166 relatively away from the od 168, so that the clutch 36 is free to move to ither of its driving positions. The rock shaft 54 is then locked in this running position by he engagement of a detent 174 with a recessed houlder 176 formed in the periphery of an ecentric disk 178 secured to the rock shaft 154. The detent 174 is formed on the end of a plunger 180 slidably supported in a journal bearing 181 n the base 10 and in a flanged bushing 182 rigidy held in place by screws 183. The plunger 180 s supported against rotational movement by neans of a key 184 which is fitted into keyways ormed in the plunger 180 and bushing 182. A ompression spring 186 coiled about the plunger 180 and seated at one end against the bearing 182 and at its other end against the enlarged nead of the plunger forming the detent 174, serves to support the detent yieldingly in engagement with the peripheral surface of the eccentric disk 178.

In accordance with a principal feature of the present invention, applicants provide a novel and improved knockout device for disengaging the main clutch 36 which may be operated automatically by stop dogs carried on the saddle support 12, or alternatively by means of a manually operable knockout lever. This mechanism is arranged to retract the plunger 180 and detent 174, thereby releasing the rock shaft 154 which then rotates in a counterclockwise direction under the influence of its spring 170, causing the clutch member 36 to be shifted to neutral position by the engagement of pins 166 with the rod 168.

The knockout mechanism specifically comprises a knockout element in the form of a sleeve member 188 which is supported to turn on a bushing 190 on the plunger 180, and is seated at its outer end against an end thrust bearing formed by a flange 192 on the bushing 190. A collar 193 pinned to the end of the plunger 180 supports the bushing 190 against axial slippage on the plunger. At its inner end the sleeve member 188 is fitted with a ball and a cam connection which is rendered operative by rotational movement of the sleeve member 188 to force the sleeve member and plunger 180 axially outwardly. The ball and cam connection referred to, comprises two pairs of conical-shaped cam recesses 194, 196 oppositely located in the outer face of the bushing 182 and in the recessed abutting face of the sleeve member 188. Two steel balls 198 are fitted into the recesses 194, 196. The inward pressure exerted on the plunger 180 and sleeve member 188 by the spring 186 tends normally to maintain the sleeve member 188 in an angular position in which the balls 198 are seated in the bottoms of the conical-shaped cam recesses 194, 196, and in which the detent 178 is permitted to engage in a locking position against the recessed shoulder 176. With this arrangement of the parts, it will readily be seen that rotational movement of the knockout element or sleeve member 188 in either direction, will cause the sleeve member 188 to be forced outwardly by the operation of the ball and cam connection above described, carrying with it the plunger 180 and detent 174 to disengage the detent from the notched recess 176, and thereby to disengage the clutch 36. It will be seen also that with the recessed construction of the sleeve member 188 above referred to, a protecting flange is provided which at all times covers and provides adequate protection for the ball and cam connection against possible entry of dirt or grit.

Further in accordance with the present invention, a particularly simple and efficient construction and arrangement of the knockout device is provided in which the knockout element or sleeve member 188 is arranged to be controlled either manually or automatically by means of manual and dog-actuated controllers which are formed as integral parts of the knockout element. A forwardly extending control lever 200 formed integrally with the sleeve member 188 provides convenient means under the control of the operator for actuating the knockout device to throw out the clutch. There is also formed on the sleeve member 188, an upwardly extending arm 202 which is arranged to be engaged by either of two stop dogs 204, 206 adjustably supported in a T-shaped slot 208 in the right hand end of the saddle support 12. The continued step-by-step cross feed of the saddle support 12 during power operation of the machine, will cause one or the other of the stop dogs 204, 206 to engage with and rock the lever arm 202 and sleeve member 188, thereby disengaging the detent 174 from its notched recess 176 to throw out the clutch member 36 and stop the machine It will be understood that the invention is not limited to the specific embodiment shown, and that various deviations may be made therefrom without departing from the spirit and scope of the appended claims.

What is claimed is:

1. In a machine tool having a support assembly comprising a plurality of supports movable in diverse directions, and power means for reciprocating one of said supports and for moving another of said supports in a diverse direction, a power throw-out device including actuating means having a yielding action to disconnect said supports from power operation, a detent normally operative to lock said power throw-out device out of operation, a knockout element having manually actuated and dog actuated controllers attached integrally therewith, dogs on said diversely movable support for engagement with said dog actuated controller, and cam means rendered operative by actuation of said knockout element to withdraw the detent.

2. In a machine tool having a support assembly comprising a plurality of supports movable in diverse directions, and power means for reciprocating one of said supports and for moving another of said supports in a diverse direction, a power throw-out device including actuating means having a yielding action to disconnect said supports from power operation, a detent plunger normally operative to lock said power throw-out device out of operation, a knockout element sleeved on said detent plunger and having manually actuated and dog actuated controllers attached integrally therewith, dogs on said diversely movable support for engagement with said dog-actuated controller, and cam means rendered operative by rotational movement of said knockout element to withdraw the detent plunger.

3. In a machine tool having a support assembly comprising a plurality of supports movable in diverse directions, power means including a clutch having neutral and alternate reverse running positions, and connections therefrom for reciprocating one of said supports, and means actuated by said connections for moving another of said supports in a diverse direction, clutch shifting means controlled by movement of said first-mentioned support for automatically reciprocating the same, a yieldingly acting device for shifting the clutch to neutral position, a detent normally operative to lock said clutch shifting device out of operation, a knockout element, and cam means rendered operative by movement of the knockout element to withdraw the detent and thereby to permit action of said device to shift the clutch to neutral position.

4. In a machine tool having a support assembly comprising a plurality of supports movable in diverse directions, power means including a clutch having neutral and alternate reverse running positions, and connections therefrom for reciprocating one of said supports and for moving another of said supports in a diverse direction, clutch shifting means operable to control the movement of said supports, a yieldingly acting device for shifting the clutch to neutral position, a detent plunger, means supporting said detent plunger yieldingly in position to lock said device out of operation, a knockout element supported to rotate with relation to and to move axially with said detent plunger, and cam means rendered operative by rotational movement of said knockout element to withdraw said knockout element and detent plunger therewith axially to permit action of said device to shift the clutch to neutral position.

5. In a machine tool having a support assembly comprising a plurality of supports movable in diverse directions, power means including a clutch having neutral and alternate reverse running positions, and connections therefrom for reciprocating one of said supports, and for moving another of said supports in a diverse direction, clutch shifting means operable to control the movement of said supports, a yieldingly acting device for shifting the clutch to neutral position, a detent normally operative to lock said clutch shifting device out of operation, a knockout element actuable to withdraw the detent and having a manual controller and a dog-actuated controller attached thereto, and dogs rendered operative by movement of said diversely movable support to engage with said dog-actuated controller.

6. In a machine tool having a support assembly comprising a base support, and a saddle support and a main support movable in diverse directions on said base support, power means including a clutch on said base support having neutral and reverse running positions, connections therefrom for moving the main support, and for moving said saddle support, clutch shifting means operable to control the movement of said main support and saddle support, a clutch throwout device including means having a yielding action to shift the clutch to neutral position, a detent plunger, and spring means for supporting said plunger normally in position to lock said device out of operation, a knockout element comprising a sleeve member rotatable on the plunger, and cam means rendered operative by rotational movement of the knockout element to withdraw the detent plunger and thereby to permit action of said throwout device to shift the clutch to neutral position, said cam means being further arranged to be acted upon by said plunger supporting spring means to return the plunger and knockout element to their initial position.

7. In a machine tool having a support assembly comprising a base support, and a saddle support and a main support movable in diverse directions on said base support, power means including a clutch on said base support having neutral and reverse running positions, connections therefrom for moving the main support, and for moving the saddle support, clutch shifting means operable to control the movement of said main support and saddle support, a clutch throw-out device including a rock shaft and means tending to rock said shaft in a direction to shift the clutch to neutral position, an eccentric disk having a recessed stop surface mounted on the shaft, a detent plunger slidably and non-rotatably mounted on the base support for engagement with said stop surface to lock said device out of operation, spring means urging the plunger against the eccentric disk, a knockout element comprising a sleeve member rotatable on the plunger and connected to move the plunger axially therewith, and a ball and cam connection interposed between the base support and the sleeve rendered operative by rotational movement of the sleeve member for imparting an axial movement thereto to withdraw the detent plunger and thereby to permit rotational movement of the rock shaft to shift the clutch to neutral position.

8. In a machine tool having a support assembly comprising a base support, and a saddle support and a main support movable in diverse directions on said base support, power means including a clutch on said base support having neutral and reverse running positions, connections therefrom for moving the main support, means actuated by said connections for moving said saddle support, clutch shifting means controlled by movement of said main support for automatically reciprocating the same, a clutch throw-out device including means having a yielding action to shift the clutch to neutral position, a detent plunger slidably and non-rotatably mounted on the base support, and spring means for urging said plunger axially into position to lock said device out of operation, a knockout element comprising a sleeve member rotatably supported on the detent plunger and connected to move the detent plunger axially therewith, a ball and cam connection interposed between a recessed face of the sleeve member and an abutting surface of the base support, whereby rotational movement of the sleeve member is effective to impart an axial withdraw movement to the sleeve member and plunger associated therewith, a manual controller and a dog actuated controller formed integrally with said sleeve member, and dogs on the saddle support for engagement with said dog-actuated controller.

GEORGE N. LEVESQUE.
MERRILL F. SEBRING.